US011685246B2

(12) United States Patent
Larsson

(10) Patent No.: US 11,685,246 B2
(45) Date of Patent: Jun. 27, 2023

(54) VEHICLE POWERTRAIN SYSTEM, A VEHICLE, AND A METHOD FOR OPERATING A VEHICLE POWERTRAIN SYSTEM

(71) Applicant: Ningbo Geely Automobile Research & Development Co., Ltd., Ningbo (CN)

(72) Inventor: Johannes Larsson, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/539,689

(22) Filed: Dec. 1, 2021

(65) Prior Publication Data

US 2022/0097509 A1 Mar. 31, 2022

Related U.S. Application Data

(63) Continuation of application No. PCT/CN2020/094180, filed on Jun. 3, 2020.

(30) Foreign Application Priority Data

Jun. 11, 2019 (EP) .................................... 19179415

(51) Int. Cl.
*B60K 1/00* (2006.01)
*B60K 17/08* (2006.01)
(Continued)

(52) U.S. Cl.
CPC ................ *B60K 1/00* (2013.01); *B60K 17/08* (2013.01); *B60K 17/16* (2013.01); *F16H 37/082* (2013.01); *B60K 2001/001* (2013.01)

(58) Field of Classification Search
CPC .......... B60K 1/00; B60K 17/08; B60K 17/16; B60K 2001/001; B60K 17/046;
(Continued)

(56) References Cited

U.S. PATENT DOCUMENTS 9,033,839 B2    5/2015  Rossey
11,149,823 B2*  10/2021 Engerman ............... F16H 48/12
(Continued)

FOREIGN PATENT DOCUMENTS

CN      105270168 A    1/2016
CN      105276105 A    1/2016
(Continued)

OTHER PUBLICATIONS

International Search Report from corresponding International Application No. PCT/CN2020/094180, dated Sep. 4, 2020, 2 pages.

*Primary Examiner* — Justin Holmes
(74) *Attorney, Agent, or Firm* — Tucker Ellis LLP

(57) ABSTRACT

A vehicle powertrain system includes an electric motor, a planetary gear set, a coupling unit, and a differential unit, wherein the electric motor is drivingly connected to the planetary gear set via a motor shaft extending in an axial direction, and wherein the planetary gear set is operably connectable to the differential unit via the coupling unit, wherein the powertrain system further comprises an idle gear wheel and a differential drive gear wheel arranged on the differential unit, wherein the coupling unit is arranged for selectively transferring torque to the idle gear wheel, and wherein the idle gear wheel and the differential drive gear wheel are arranged to drivingly interact with each other for transferring torque from the electric motor to the differential unit, via the planetary gear set and the coupling unit.

16 Claims, 5 Drawing Sheets

(51) Int. Cl.
*B60K 17/16* (2006.01)
*F16H 37/08* (2006.01)

(58) Field of Classification Search
CPC ........ B60K 17/00; B60K 17/02; B60K 23/04; F16H 37/082; B60Y 2400/73; Y02T 10/62
See application file for complete search history.

(56) References Cited

U.S. PATENT DOCUMENTS

| | | | |
|---|---|---|---|
| 2002/0019284 A1* | 2/2002 | Aikawa | B60W 20/10 903/952 |
| 2009/0211386 A1 | 8/2009 | Hayes | |
| 2014/0358340 A1* | 12/2014 | Radev | B60W 10/26 180/65.265 |
| 2015/0224867 A1* | 8/2015 | Nett | B60K 6/48 180/65.21 |
| 2018/0326846 A1* | 11/2018 | Soto Velasco | B60K 1/00 |
| 2019/0383373 A1* | 12/2019 | Engerman | B60K 17/12 |

FOREIGN PATENT DOCUMENTS

| | | |
|---|---|---|
| CN | 106029419 A | 10/2016 |
| CN | 206086366 U | 4/2017 |
| CN | 106965671 A | 7/2017 |
| CN | 108944389 A | 12/2018 |
| DE | 102010049550 A1 | 4/2012 |
| DE | 102012101984 A1 | 9/2013 |
| KR | 20130104368 A | 9/2013 |

\* cited by examiner

VEHICLE POWERTRAIN SYSTEM, A VEHICLE, AND A METHOD FOR OPERATING A VEHICLE POWERTRAIN SYSTEM

RELATED APPLICATION DATA

This application is a continuation of International Patent Application No. PCT/CN2020/094180, filed Jun. 3, 2020, which claims the benefit of European Patent Application No. 19179415.5, filed Jun. 11, 2019, the disclosures of which are incorporated herein by reference in their entireties.

TECHNICAL FIELD

The present disclosure relates to a vehicle powertrain system comprising an electric motor, a planetary gear set and a coupling unit. The disclosure further relates to a vehicle comprising a vehicle powertrain system, and a method for operating a vehicle powertrain system.

BACKGROUND

In vehicle applications, powertrains are used for transferring torque from a power source via a transmission to one or more driving wheels of the vehicle, and there are many different powertrain layouts and designs available. Electric powertrains are becoming more popular and may be operated as fully electric powertrains with one or more electric motors or as hybrid powertrains where one or more electric motors are operated in combination with an internal combustion engine.

Conventional transmissions and powertrain systems are often complex in design and are having large volume constructions with high weight loads. Conventional transmissions are designed with a high complexity involving a high number of components, and are often expensive and time consuming to manufacture.

There is thus a need for an improved powertrain system having a compact layout and low weight, where the powertrain system is optimized for low volume packing in modern electric and hybrid vehicle designs. Further, there is a need for compact powertrain systems that are cheap to manufacture and simple in construction with few components, where the powertrain system is operated with high efficiency.

SUMMARY

An object of the present disclosure is to provide a vehicle powertrain system, a vehicle comprising a vehicle powertrain system, and a method for operating a vehicle powertrain system, where the previously mentioned problems are avoided. This object is at least partly achieved by the features of the independent claims. The dependent claims contain further developments of the vehicle powertrain system, the vehicle comprising the vehicle powertrain system, and the method for operating the vehicle powertrain system.

The disclosure concerns a vehicle powertrain system comprising an electric motor, a planetary gear set, a coupling unit, and a differential unit. The electric motor is drivingly connected to the planetary gear set via a motor shaft extending in an axial direction, and the planetary gear set is operably connectable to the differential unit via the coupling unit. The powertrain system further comprises an idle gear wheel and a differential drive gear wheel arranged on the differential unit, and the coupling unit is arranged for selectively transferring torque to the idle gear wheel. The idle gear wheel and the differential drive gear wheel are arranged to drivingly interact with each other for transferring torque from the electric motor to the differential unit, via the planetary gear set and the coupling unit.

Advantages with these features are that the powertrain system is simple in construction with few components and possible to manufacture with a compact design. Further, the powertrain system can through the compact design be manufactured with low weight and optimized for low volume packing in modern electric and hybrid vehicle constructions. Since there are few components involved, the powertrain is cheap to manufacture and simple in construction. With the layout described, the powertrain system can be operated with high efficiency. The powertrain system can for example be used on a front or rear axle in hybrid vehicles, or on a front axle and/or a rear axle in electric vehicles, providing a flexible gear reducer arranged to balance torque and maximum speed on the wheels of the vehicle. With the compact design of the powertrain system, the differential unit can be placed in the centre of the vehicle to allow long directly mounted drive shafts. Benefits of having long drive shafts are lower angle variations when the suspension is moving, which is better for durability and efficiency, as well as for noise, vibration, and harshness (NVH).

According to an aspect of the disclosure, the planetary gear set comprises a sun gear, a ring gear, and two or more planet gears connected to a planet carrier. The coupling unit comprises a coupling shaft and an actuating member arranged on the coupling shaft. The motor shaft is drivingly connected to the sun gear, and the coupling shaft is drivingly connected to the planet carrier. The idle gear wheel is arranged on the coupling shaft. The powertrain system is a single planetary gear set system comprising only one planetary gear set. The single planetary gear set is providing a compact layout of the powertrain system and through the compact design, the powertrain system can be optimized for low volume packing.

According to another aspect of the disclosure, the actuating member is arranged to selectively connect the idle gear wheel to and disconnect the idle gear wheel from the coupling shaft. The actuating member is used for connecting and disconnecting the idle gear wheel, and the idle gear wheel is when connected transferring torque to the differential unit.

According to an aspect of the disclosure, the actuating member is a synchronizer slidingly arranged on the coupling shaft, and the idle gear wheel is journally connected to the coupling shaft via a second bearing. The synchronizer is providing an efficient shifting between the connected and disconnected positions of the idle gear wheel. The second bearing is providing an idle position for the idle gear wheel when disconnected.

According to another aspect of the disclosure, the powertrain system further comprises a housing structure. The motor shaft is journaled against the housing structure via a first bearing, and the ring gear is non-rotatably attached to the housing structure. The housing structure is securing that axial and radial forces can be handled efficiently while providing a construction with a reduced tolerance chain from the electric motor to the planetary gear set. The construction is providing reduced risk for misalignment issues.

According to a further aspect of the disclosure, the differential unit comprises a differential housing, where the housing structure is directly attached to the differential housing. The direct attachment of the housing structure and the differential housing is securing that forces can be handled efficiently while providing a construction with a reduced tolerance chain from the electric motor to the differential unit. The construction is providing reduced risk for misalignment problems in the powertrain system.

According to an aspect of the disclosure, the coupling shaft is extending in the axial direction in a coaxial relationship to the motor shaft. The ring gear is coaxially arranged around the motor shaft and the sun gear is arranged to rotate with the motor shaft around an axis extending in the axial direction. With the coaxial relationships, the compact layout of the powertrain system is achieved.

According to another aspect of the disclosure, in a drive mode the coupling unit is arranged to be drivingly connected to the idle gear wheel, where the idle gear wheel is prevented from rotating in relation to the coupling shaft. In the drive mode, the powertrain system is configured to transfer torque from the electric motor to the differential unit via the motor shaft, the sun gear, the two or more planet gears, the planet carrier, the coupling shaft, the actuating member, the idle gear wheel, and the differential drive gear wheel. The drive mode is used for transferring torque from the electric motor to the differential unit in different driving conditions.

According to a further aspect of the disclosure, in an idle mode the coupling unit is arranged to be disconnected from the idle gear wheel, where the idle gear wheel is allowed to rotate in relation to the coupling shaft. In the idle mode, the powertrain system is configured to prevent torque transfer from the electric motor to the differential unit. The idle mode can for example be used when there is no need to transfer torque from the electric motor.

According to an aspect of the disclosure, the differential unit comprises a first differential output shaft and a second differential output shaft. The first differential output shaft and the second differential output shaft are extending in the axial direction laterally on each side from the differential housing.

According to another aspect of the disclosure, the powertrain system further comprises a first drive shaft connected to and extending from the first differential output shaft and a second drive shaft connected to and extending from the second differential output shaft. The first drive shaft is having an axial length greater than an axial length of the first differential output shaft, and the second drive shaft is having an axial length greater than an axial length of the second differential output shaft. With this layout, the differential unit can be placed in the centre of the vehicle to allow long directly mounted drive shafts, providing lower angle variations when the suspension is moving, which is better for durability and efficiency, as well as for noise, vibration, and harshness (NVH).

According to an aspect of the disclosure, the first drive shaft is connected to the first differential output shaft via a first joint and the second drive shaft is connected to the second differential output shaft via a second joint. The first joint is configured for allowing angular displacement of the first drive shaft in relation to the first differential output shaft and the second joint is configured for allowing angular displacement of the second drive shaft in relation to the second differential output shaft. The joints are providing a compact solution for the vehicle powertrain system, allowing an efficient angular displacement of the drive shafts. The joints are further supporting the layout with the differential unit placed in the centre of the vehicle for lower angle variations of long drive shafts in relation to the differential output shafts when the suspension is moving, which is better for durability and efficiency, as well as for noise, vibration, and harshness (NVH).

According to a further aspect of the disclosure, the powertrain system further comprises an inverter unit. The electric motor and the inverter unit are laterally arranged on each side of the planetary gear set and differential unit. With the arrangement of the electric motor and the inverter unit on each side of the differential unit, the powertrain system fits well in the suspension sub-frame of the vehicle. When the powertrain system is arranged in a hybrid vehicle, this design allows an exhaust pipe to pass below the electric motor.

According to an aspect of the disclosure, the powertrain system is a single planetary gear set system. The powertrain system thus comprises only one single planetary gear set for a compact and low-weight design.

According to another aspect of the disclosure, the differential unit is configured for being positioned in a lateral centre section of a vehicle in which the vehicle powertrain system is arranged. With the compact design of the powertrain system, the differential unit can be placed in the lateral centre section of the vehicle, allowing long directly mounted drive shafts with lower angle variations when the suspension is moving, which is better for durability and efficiency, as well as for noise, vibration, and harshness (NVH).

The disclosure further concerns a vehicle comprising a vehicle powertrain system, where the axial direction of the powertrain system is essentially perpendicular to a longitudinal vehicle direction, and where the powertrain system is arranged in connection to the vehicle for positioning the differential unit in a lateral centre section of the vehicle. With the compact design of the powertrain system, the differential unit can be placed in the lateral centre section of the vehicle to allow long directly mounted drive shafts. The long drive shafts are allowing lower angle variations when the suspension is moving, which is better for durability and efficiency, as well as for noise, vibration, and harshness (NVH).

According to other aspects of the disclosure, the vehicle powertrain system is arranged in a front part or a rear part of the vehicle; or the vehicle comprises a first vehicle powertrain system arranged in a front part of the vehicle and a second vehicle powertrain system arranged in a rear part of the vehicle. The powertrain system can for example be used on a front or rear axle in hybrid vehicles or electric vehicles, and provides a flexible gear reducer arranged to balance torque and maximum speed on the wheels of the vehicle. The powertrain system can with this configuration as an alternative be arranged on both a front and rear axle in hybrid vehicles or electric vehicles, and provides a flexible gear reducer arranged to balance torque and maximum speed on the wheels of the vehicle.

The disclosure further concerns a method for operating a vehicle powertrain system, where the powertrain system comprises an electric motor, a planetary gear set, a coupling unit, and a differential unit. The electric motor is connected to the planetary gear set, and the planetary gear set is connectable to the differential unit via the coupling unit. The electric motor comprises a motor shaft. The planetary gear set comprises a sun gear, a ring gear, and two or more planet gears connected to a planet carrier. The coupling unit comprises a coupling shaft and an actuating member arranged on the coupling shaft. The motor shaft is connected to the sun gear, and the coupling shaft is connected to the planet carrier. The powertrain system further comprises an idle gear wheel arranged on the coupling shaft and a differential drive gear wheel arranged on the differential unit. The idle gear wheel and the differential drive gear wheel are arranged to interact with each other for transferring torque from the electric motor to the differential unit, via the planetary gear set and the coupling unit. The method comprises the steps: when receiving a command to operate the powertrain system in a drive mode, connecting the coupling unit to the idle gear wheel, wherein the idle gear wheel is rotating with the coupling shaft prevented from rotating in relation to the coupling shaft; and transferring torque from the electric motor to the differential unit via the motor shaft, the sun gear, the two or more planet gears, the planet carrier, the coupling shaft, the actuating member, the idle gear wheel, and the differential drive gear wheel; when receiving a command to operate the powertrain system in an idle mode, disconnecting the coupling unit from the idle gear wheel, wherein the idle gear wheel is allowed to rotate in relation to the coupling shaft, and wherein the powertrain system is prevented from transferring torque from the electric motor to the differential unit.

According to an aspect of the disclosure, the differential unit is configured for being positioned in a lateral centre section of a vehicle in which the vehicle powertrain system is arranged. With the compact design of the powertrain system, the differential unit can be placed in the lateral centre section of the vehicle, allowing long directly mounted drive shafts with lower angle variations when the suspension is moving, which is better for durability and efficiency, as well as for noise, vibration, and harshness (NVH).

BRIEF DESCRIPTION OF THE DRAWINGS

The disclosure will be described in greater detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
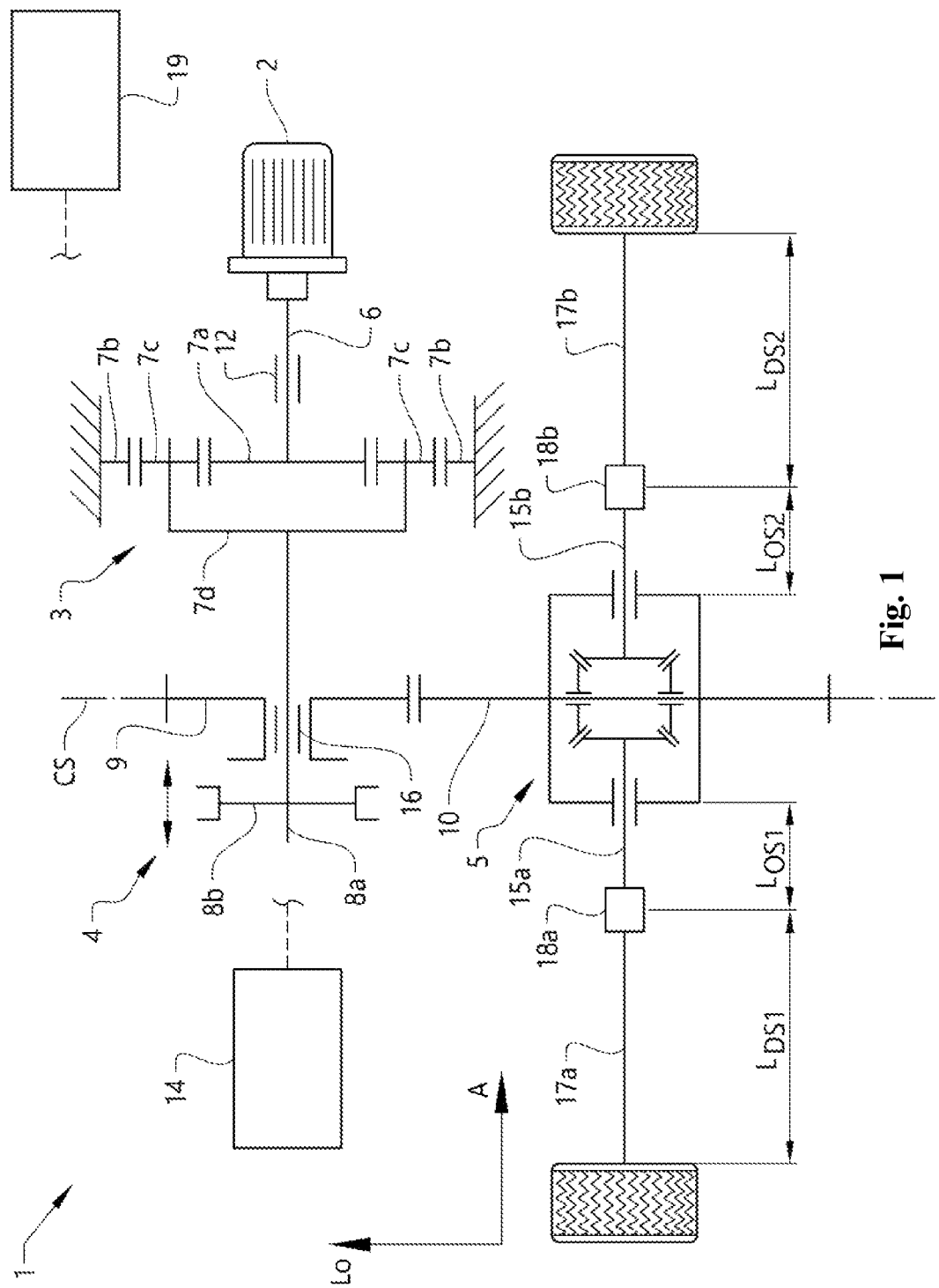
FIG. 1 shows schematically, a layout view of the vehicle powertrain system according to the disclosure.
Figure 5:
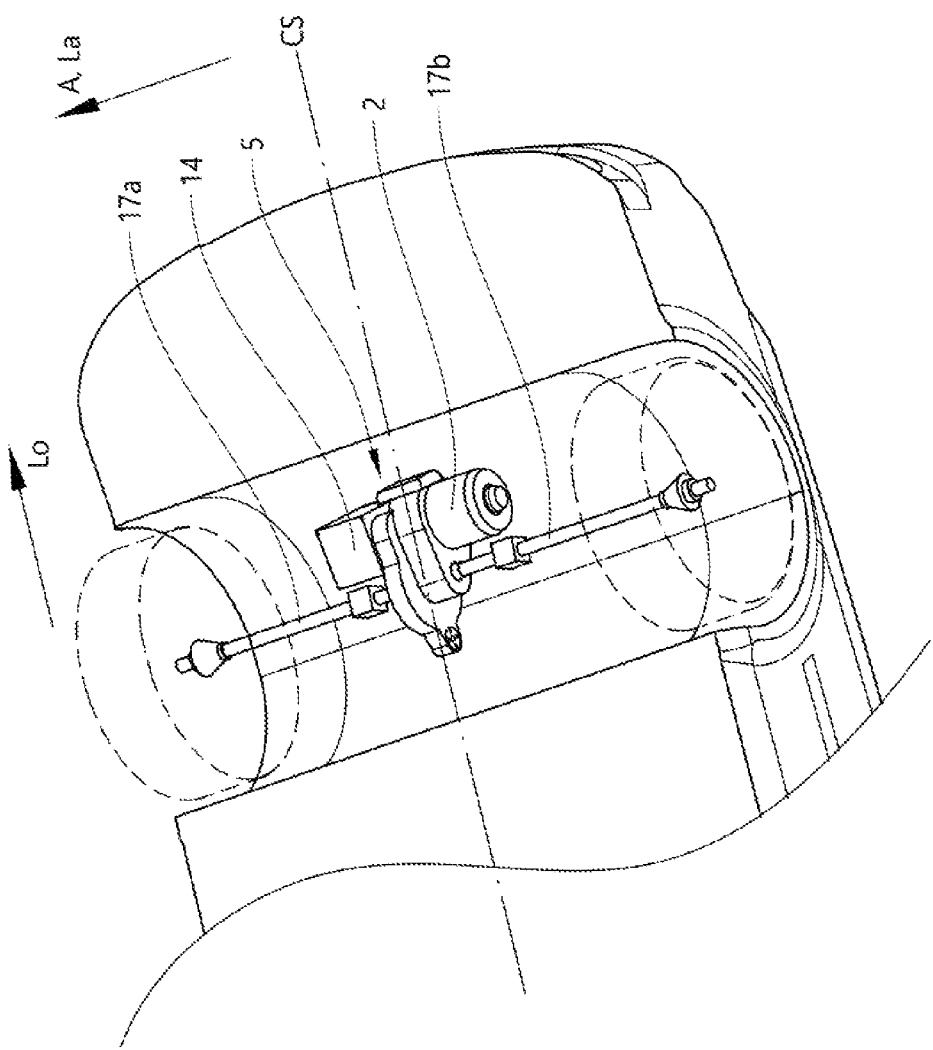
FIG. 5 shows schematically, a perspective view of a section of a vehicle comprising the vehicle powertrain system according to the disclosure.

FIGS. 1-5 show schematically a vehicle powertrain system 1 according to the disclosure, where the powertrain system 1 comprises an electric motor 2, a planetary gear set 3, a coupling unit 4, and a differential unit 5. The powertrain system may for example be arranged in connection to a rear axle or a front axle of a hybrid vehicle, or in connection to a front axle and/or a rear axle of an electric vehicle, providing a flexible gear reducer for balancing torque and maximum speed on the wheels of the vehicle. In FIG. 1, a layout of the powertrain system 1 is schematically illustrated, and in FIGS. 2-5, the compact and flexible design of the powertrain system 1 is shown. In FIG. 5, a section of the vehicle comprising the vehicle powertrain system 1 is schematically illustrated.

Figure 2:
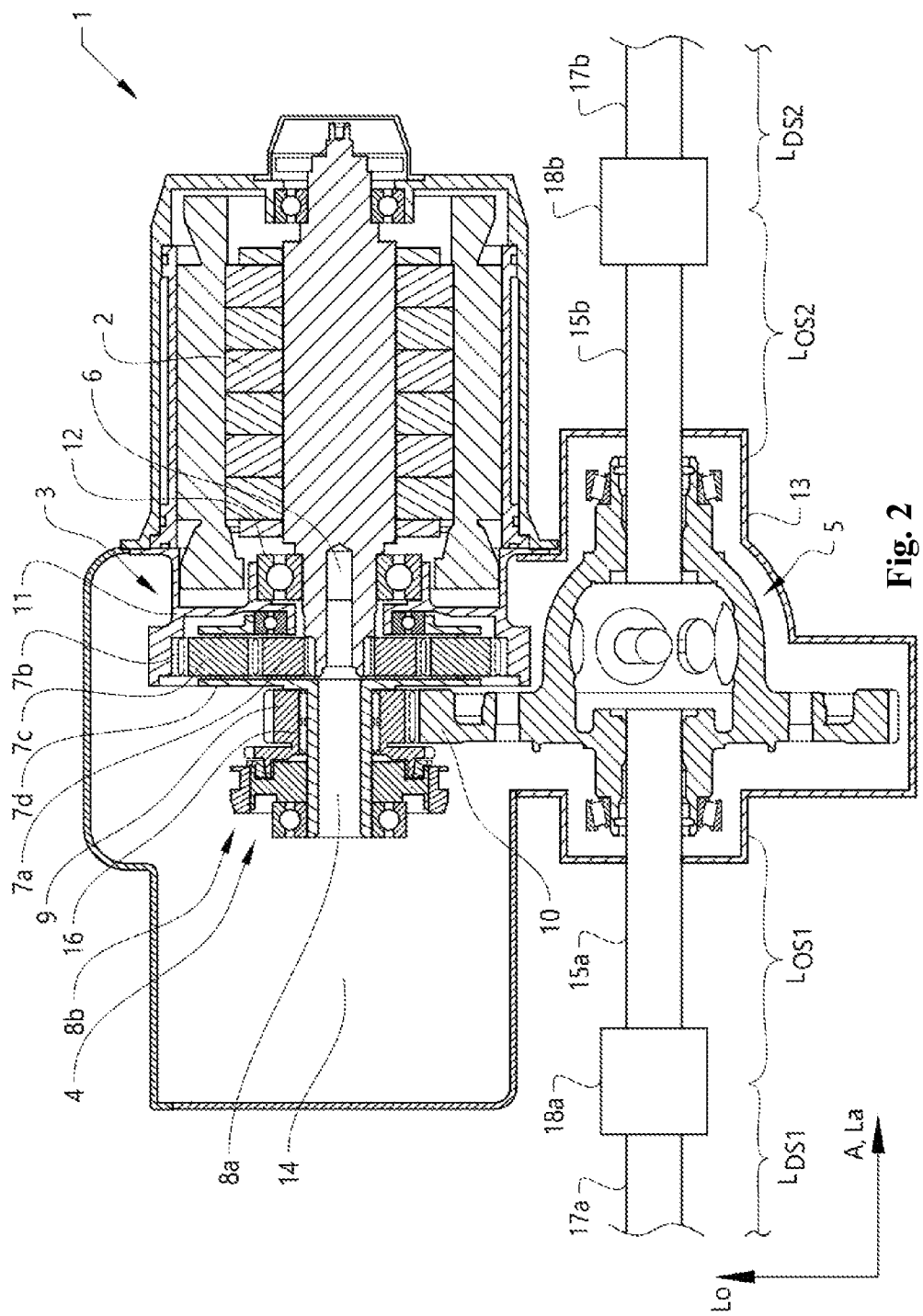
FIG. 2 shows schematically, a cross-sectional view of the vehicle powertrain system according to the disclosure.

As illustrated in FIGS. 1 and 2, the electric motor 2 is drivingly connected to the planetary gear set 3 via a motor shaft 6. The motor shaft 6 is extending in an axial direction A of the powertrain system 1. The planetary gear set 3 is operably connectable to the differential unit 5 via the coupling unit 4. The powertrain system 1 further comprises an idle gear wheel 9 and a differential drive gear wheel 10, and the idle gear wheel 9 and the differential drive gear wheel 10 are arranged to drivingly interact with each other for transferring torque from the electric motor 2 to the differential unit 5, via the planetary gear set 3 and the coupling unit 4. The differential drive gear wheel 10 is, as shown in FIGS. 1 and 2, arranged on the differential unit 5. The differential unit 5 may be any suitable type of conventional differential construction. The coupling unit 4 is arranged for selectively transferring torque to the idle gear wheel 9, as will be further described below.

As shown in FIGS. 1 and 2, the planetary gear set 3 comprises a sun gear 7a, a ring gear 7b, and two or more planet gears 7c connected to a planet carrier 7d. The coupling unit 4 comprises a coupling shaft 8a and an actuating member 8b arranged on the coupling shaft 8a. The motor shaft 6 is drivingly connected to the sun gear 7a, and when transferring torque from the electric motor 2 to the motor shaft 6, the sun gear 7a is rotating with the motor shaft 6. The coupling shaft 8a is drivingly connected to the planet carrier 7d. When torque is transferred to the planet carrier 7d from the sun gear 7a and the planet gears 7c, the coupling shaft 8a is rotating with the planet carrier 7d. As further illustrated in FIGS. 1 and 2, the idle gear wheel 9 is arranged on the coupling shaft 8a. The coupling shaft 8a is extending in the axial direction A in a coaxial relationship to the motor shaft 6. The ring gear 7b is coaxially arranged around the motor shaft 6 and the sun gear 7a is arranged to rotate with the motor shaft 6 around an axis extending in the axial direction A. The powertrain system 1 is a single planetary gear set system comprising only one planetary gear set 3 providing a compact and low-weight design.

The powertrain system 1 is configured to transfer torque from the electric motor 2 to the differential unit 5 via the motor shaft 6, the sun gear 7a, the two or more planet gears 7c, the planet carrier 7d, the coupling shaft 8a, the actuating member 8b, the idle gear wheel 9, and the differential drive gear wheel 10. With the disclosed construction of the powertrain system 1, the planetary gear set 3 is providing a compact layout and through the compact design the powertrain system 1 can be optimized for low volume packing. The gear ratio of the planetary gear set 3 can be changed for different vehicle applications with minimal changes of surrounding components.

The powertrain system 1 further comprises a housing structure 11, as schematically shown in FIG. 2. The motor shaft 6 is journaled against the housing structure 11 via a first bearing 12, and the ring gear 7b of the planetary gear set 3 is non-rotatably attached to the housing structure 11. The motor shaft 6 is thus allowed to rotate in relation to the housing structure 11. The first bearing 12 may be any suitable type of bearing providing stability and low friction. The housing structure 11 is securing that axial and radial forces of the powertrain system 1 can be handled efficiently. The housing structure 11 is further providing a construction with a reduced tolerance chain from the electric motor 2 to the planetary gear set 3, where risks for misalignment issues in parts of the powertrain system 1 are reduced.

The actuating member 8b is arranged to selectively connect the idle gear wheel 9 to and disconnect the idle gear wheel 9 from the coupling shaft 8a, which may be dependent of the driving mode of the vehicle. The actuating member 8b is thus used for selectively controlling the torque flow of the powertrain system 1 through the connecting and disconnecting function of the idle gear wheel 9 with the coupling shaft 8a. When the actuating member 8b is connected to and in engagement with the idle gear wheel 9, torque is transferred to the idle gear wheel 9 from the planet carrier 7d, via the coupling shaft 8a and the actuating member 8b. When the actuating member 8b is disconnected from the idle gear wheel 9, no torque is transferred to the idle gear wheel 9 from the planet carrier 7d. The actuating member 8b may be any type of suitable coupling unit used for vehicle transmission applications, such as for example a synchronizer, a dog clutch or similar arrangement. The coupling shaft 8a may be arranged with splines or other suitable means for holding the actuating member 8b in a rotating engagement with the coupling shaft 8a, where the actuating member 8b is allowed to slide axially in relation to the coupling shaft 8a for connecting and disconnecting the idle gear wheel 9.

In the embodiment schematically illustrated in FIGS. 1 and 2, the actuating member 8a is arranged as a synchronizer, where the synchronizer is slidingly arranged on the coupling shaft 8a. The idle gear wheel 9 is journally connected to the coupling shaft 8a via a second bearing 16. The second bearing 16 is allowing the idle gear wheel 9 to rotate in relation to the coupling shaft 8a, when the idle gear wheel 9 is disconnected from the actuating member 8b. The second bearing 16 is thus providing an idle position for the idle gear wheel 9 when disconnected. The second bearing 16 may be any suitable type of bearing used in actuating or coupling arrangements. The synchronizer is providing an efficient shifting between the connected and disconnected positions of the idle gear wheel 9. The synchronizer may be any type of conventional synchronizer, and may comprise a synchronizer hub connected to the coupling shaft 8a. The coupling shaft 8a may be arranged with splines or other means for holding the synchronizer hub. The synchronizer may comprise, depending on the type of synchronizer, a sliding sleeve, synchronizer ring, blocker ring, friction elements, and/or other suitable components needed for connecting and disconnecting the idle gear wheel 9.

The differential unit 5 comprises a differential housing 13, which is arranged as a housing structure encompassing parts of the differential unit 5. As illustrated in FIG. 2, the housing structure 11 is directly attached to the differential housing 13. The direct attachment of the housing structure 11 to the differential housing 13 is securing that forces occurring in the powertrain system 1 can be handled efficiently while providing a construction with a reduced tolerance chain from the electric motor 2 to the differential unit 5. The arrangement with the direct attachment of the housing structure 11 to the differential housing 13 is further providing reduced risk for misalignment problems. The differential unit 5 comprises a first differential output shaft 15a and a second differential output shaft 15b. As illustrated in FIG. 2, the first differential output shaft 15a and the second differential output shaft 15b are extending in the axial direction A laterally on each side from the differential housing 13.

As shown in FIG. 1, the powertrain system 1 further comprises a first drive shaft 17a connected to and extending from the first differential output shaft 15a and a second drive shaft 17b connected to and extending from the second differential output shaft 15b. The drive shafts 17a, 17b may suitably be connected to the respective differential output shafts 15a, 15b in a conventional way with joints 18a, 18b allowing angular displacement of the drive shafts 17a, 17b in relation to the differential output shafts 15a, 15b. The first drive shaft 17a is connected to the first differential output shaft 15a via a first joint 18a. The second drive shaft 17b is connected to the second differential output shaft 15b via a second joint 18b. Thus, the first joint 18a is configured for allowing angular displacement of the first drive shaft 17a in relation to the first differential output shaft 15a, and the second joint 18b is configured for allowing angular displacement of the second drive shaft 17b in relation to the second differential output shaft 15b. The joints 18a, 18b may be of any type suitable type for transferring torque from the differential output shafts 15a, 15b to the respective drive shafts 17a, 17b. As illustrated in FIGS. 1 and 2, the first drive shaft 17a is having an axial length $L_{DS1}$ greater than an axial length $L_{OS1}$ of the first differential output shaft 15a. The second drive shaft 17b is having an axial length $L_{DS2}$ greater than an axial length Lose of the second differential output shaft 15b. With this layout, the differential unit 5 can be placed in the centre of the vehicle to allow long directly mounted drive shafts 17a, 17b, providing lower angle variations when the suspension of the vehicle is moving. Long drive shafts are better for durability and efficiency, as well as for noise, vibration, and harshness (NVH).

The powertrain system 1 further comprises an inverter unit 14 arranged for operating the electric motor 2. The inverter unit 14 may also be used for other components. As shown in FIGS. 1 and 5, the electric motor 2 and the inverter unit 14 are laterally arranged on each side of the planetary gear set 3 and differential unit 5. With the arrangement of the electric motor 2 and the inverter unit 14 laterally in the axial direction A on each side of the differential unit 5, the powertrain system 1 is designed to fit well in a suspension sub-frame of the vehicle. When the powertrain system 1 is arranged in a hybrid vehicle, this design allows an exhaust pipe to pass below the electric motor 2.

Figure 3:
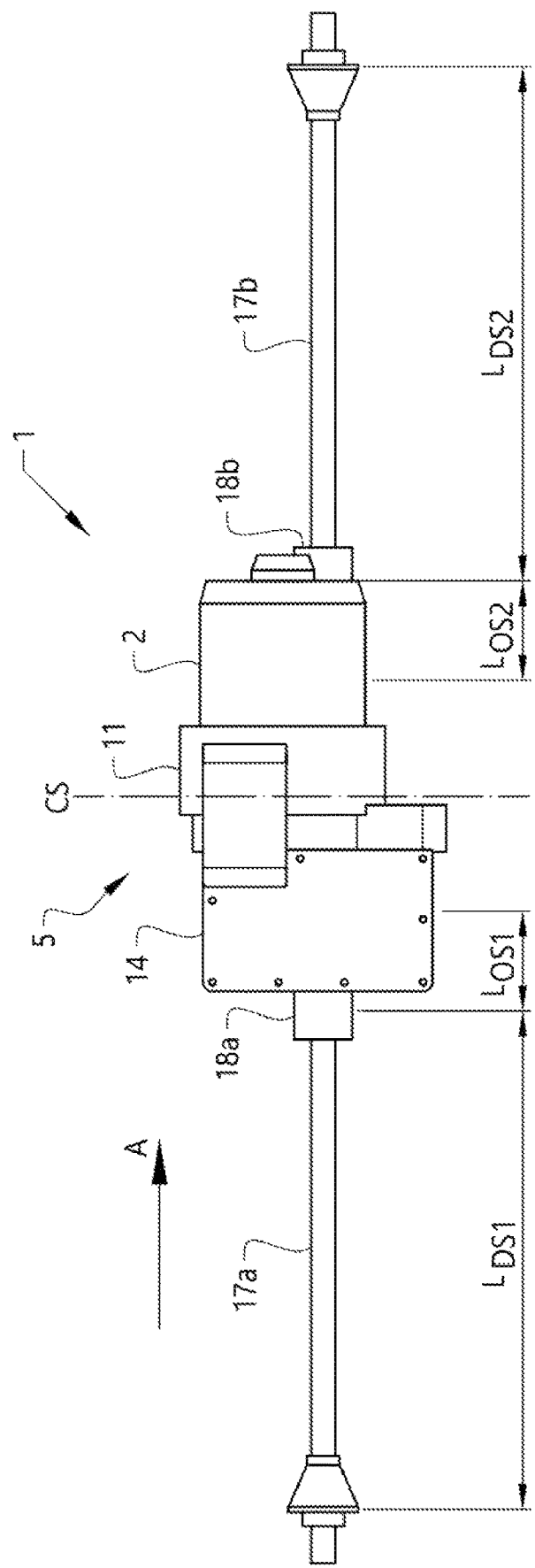
FIG. 3 shows schematically, a front view of the vehicle powertrain system according to the disclosure.
Figure 4:
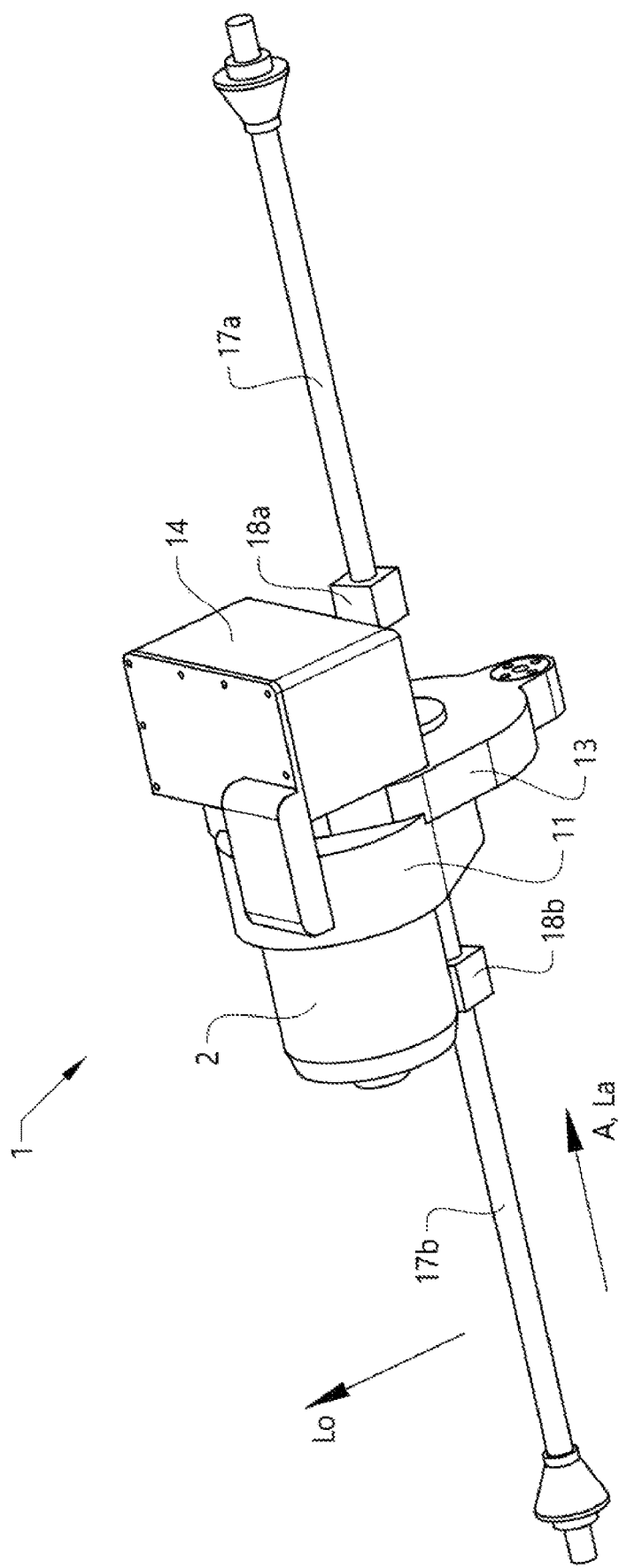
FIG. 4 shows schematically, a perspective view of the vehicle powertrain system according to the disclosure.

As schematically illustrated in FIGS. 1, 2, 4 and 5, the axial direction A of the powertrain system 1 is essentially perpendicular to a longitudinal vehicle direction Lo, and essentially parallel to a lateral vehicle direction La. The powertrain system 1 is arranged in connection to the vehicle for positioning the differential unit 5 in a lateral centre section CS of the vehicle. The powertrain system 1 is thus designed with a configuration where the differential unit 5 is positioned in the lateral centre section CS of the vehicle in which the vehicle powertrain system is arranged. The lateral centre section CS is defined as a plane perpendicular to the lateral vehicle direction La arranged at a lateral mid-section of the vehicle in the lateral vehicle direction La. The arrangement of the differential unit 5 in the lateral centre section CS of the vehicle is allowing long directly mounted drive shafts. Benefits of long drive shafts are lower angle variations on the shafts as the suspension is moving, which is better for durability, efficiency and NVH. The electric motor 2 and the inverter 14 are arranged on each side of the differential to fit well in the suspension sub-frame of the vehicle, as shown in FIG. 5. The electric motor 2 may if desired be arranged to allow an exhaust pipe of a hybrid vehicle to pass below the electric motor. In FIGS. 3 and 5, it is schematically illustrated that the differential unit 5 is positioned in the lateral centre section CS, and that the electric motor 2 and the inverter unit 14 are arranged laterally on opposite sides of the lateral centre section CS, and thus the differential unit 5, in the axial direction A.

The vehicle powertrain system 1 may be arranged in a front part or a rear part of the vehicle. In an alternative embodiment, the vehicle comprises a first vehicle powertrain system arranged in a front part of the vehicle and a second vehicle powertrain system arranged in a rear part of the vehicle, and with this arrangement of the powertrain systems the vehicle may be driven on both front and rear drive shafts in a fully electric four wheel-drive configuration.

The powertrain system 1 is arranged to operate in a drive mode and in an idle mode. In the drive mode of the powertrain system 1, the coupling unit 4 is arranged to be drivingly connected to the idle gear wheel 9. The idle gear wheel 9 is in the drive mode prevented from rotating in relation to the coupling shaft 8a and is instead rotating with the coupling shaft 8a. In the drive mode, the actuating member 8b is in engagement with the idle gear wheel 9, and the powertrain system 1 is configured to transfer torque from the electric motor 2 to the differential unit 5 via the motor shaft 6, the sun gear 7a, the two or more planet gears 7c, the planet carrier 7d, the coupling shaft 8a, the actuating member 8b, the idle gear wheel 9, and the differential drive gear wheel 10. In the idle mode of the powertrain system 1, the coupling unit 4 is arranged to be disconnected from the idle gear wheel 9. The idle gear wheel 9 is in the idle mode allowed to rotate in relation to the coupling shaft 8a. In the idle mode, the actuating member 8b is disengaged from the idle gear wheel 9, and the powertrain system 1 is configured to prevent torque transfer from the electric motor 2 to the differential unit 5. In the idle drive mode, the idle gear wheel 9 can rotate freely around the coupling shaft 8a, and since the actuating member 8b is disconnected from the idle gear wheel 9 no torque can be transferred from the electric motor 2 to the differential unit 5.

The powertrain system may further comprise a control unit 19 for controlling the operation of the powertrain system. The control unit 19 may for example control the electric motor 2, the actuating member 8b, and other components of the powertrain system 1. The control unit 19 may be integrated in or arranged in connection to the inverter unit 14 for a compact design of the powertrain system 1.

When receiving a command to operate the powertrain system 1 in the drive mode, the coupling unit 4 is being connected to the idle gear wheel 9. The idle gear wheel 9 is then rotating with the coupling shaft 8a and the idle gear wheel is through the engagement with the actuating member 8b prevented from rotating in relation to the coupling shaft 8a. Torque is in the drive mode being transferred from the electric motor 2 to the differential unit 5 via the motor shaft 6, the sun gear 7a, the two or more planet gears 7c, the planet carrier 7d, the coupling shaft 8a, the actuating member 8b, the idle gear wheel 9, and the differential drive gear wheel 10, as described above.

When receiving a command to operate the powertrain system 1 in the idle mode, the coupling unit 4 is being disconnected from the idle gear wheel 9. The idle gear wheel 9 is then allowed to rotate in relation to the coupling shaft 8a, and the powertrain system 1 is prevented from transferring torque from the electric motor 2 to the differential unit 5, as described above. The powertrain system 1 may for example be operated in the idle mode on higher traction speeds, and the synchronizer can disconnect the idle gear wheel 9 from the coupling shaft 8a for fuel-efficient driving.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Powertrain system
2: Electric motor
3: Planetary gear set
4: Coupling unit
5: Differential unit
6: Motor shaft
7a: Sun gear
7b: Ring gear
7c: Planet gears
7d: Planet carrier
8a: Coupling shaft
8b: Actuating member
9: Idle gear wheel
10: Differential drive gear wheel
11: Housing structure
12: First bearing
13: Differential housing
14: Inverter unit
15a: First differential output shaft
15b: Second differential output shaft
16: Second bearing
17a: First drive shaft
17b: Second drive shaft
18a: First joint
18b: Second joint
19: Control unit

What is claimed is:

1. A vehicle powertrain system comprising an electric motor, a planetary gear set, a coupling unit, and a differential unit,
   wherein the electric motor is drivingly connected to the planetary gear set via a motor shaft extending in an axial direction, and wherein the planetary gear set is operably connectable to the differential unit via the coupling unit,
   wherein the powertrain system further comprises an idle gear wheel and a differential drive gear wheel arranged on the differential unit, wherein the coupling unit is arranged for selectively transferring torque to the idle gear wheel, and wherein the idle gear wheel and the differential drive gear wheel are arranged to drivingly interact with each other for transferring torque from the electric motor to the differential unit, via the planetary gear set and the coupling unit,
   wherein the differential unit is configured for being positioned in a lateral centre section of a vehicle in which the vehicle powertrain system is arranged;
   wherein the differential unit comprises a first differential output shaft and a second differential output shaft, wherein the first differential output shaft and the second differential output shaft extend in the axial direction laterally on each side from a differential housing; and wherein the powertrain system further comprises a first drive shaft connected to and extending from the first differential output shaft and a second drive shaft connected to and extending from the second differential output shaft, wherein the first drive shaft has an axial length greater than an axial length of the first differential output shaft and wherein the second drive shaft has an axial length greater than an axial length of the second differential output shaft.

2. A vehicle powertrain system according to claim 1, wherein the planetary gear set comprises a sun gear, a ring gear, and two or more planet gears connected to a planet carrier, and wherein the coupling unit comprises a coupling shaft and an actuating member arranged on the coupling shaft, wherein the motor shaft is drivingly connected to the sun gear, the coupling shaft is drivingly connected to the planet carrier, and wherein the idle gear wheel is arranged on the coupling shaft.

3. A vehicle powertrain system according to claim 2, wherein the actuating member is arranged to selectively connect the idle gear wheel to and disconnect the idle gear wheel from the coupling shaft.

4. A vehicle powertrain system according to claim 2, wherein the actuating member is a synchronizer slidingly arranged on the coupling shaft, and wherein the idle gear wheel is journally connected to the coupling shaft via a second bearing.

5. A vehicle powertrain system according to claim 2, wherein the powertrain system further comprises a housing structure, wherein the motor shaft is journaled against the housing structure via a first bearing, and wherein the ring gear is non-rotatably attached to the housing structure.

6. A vehicle powertrain system according to claim 5, wherein the differential unit comprises a differential housing, wherein the housing structure is directly attached to the differential housing.

7. A vehicle powertrain system according to claim 2, wherein the coupling shaft extends in the axial direction in a coaxial relationship to the motor shaft, wherein the ring gear is coaxially arranged around the motor shaft and wherein the sun gear is arranged to rotate with the motor shaft around an axis extending in the axial direction.

8. A vehicle powertrain system according to claim 2, wherein in a drive mode the coupling unit is arranged to be drivingly connected to the idle gear wheel, wherein the idle gear wheel is prevented from rotating in relation to the coupling shaft, wherein in the drive mode the powertrain system is configured to transfer torque from the electric motor to the differential unit via the motor shaft, the sun gear, the two or more planet gears, the planet carrier, the coupling shaft, the actuating member, the idle gear wheel, and the differential drive gear wheel.

9. A vehicle powertrain system according to claim 2, wherein in an idle mode the coupling unit is arranged to be disconnected from the idle gear wheel, wherein the idle gear wheel is allowed to rotate in relation to the coupling shaft, and wherein in the idle mode the powertrain system is configured to prevent torque transfer from the electric motor to the differential unit.

10. A vehicle powertrain system according to claim 1, wherein the first drive shaft is connected to the first differential output shaft via a first joint and the second drive shaft is connected to the second differential output shaft via a second joint, wherein the first joint is configured for allowing angular displacement of the first drive shaft in relation to the first differential output shaft and the second joint is configured for allowing angular displacement of the second drive shaft in relation to the second differential output shaft.

11. A vehicle powertrain system according to claim 1, wherein the powertrain system further comprises an inverter unit, wherein the electric motor and the inverter unit are laterally arranged on each side of the planetary gear set and differential unit.

12. A vehicle powertrain system according to claim 1, wherein the powertrain system is a single planetary gear set system.

13. A vehicle comprising a vehicle powertrain system according to claim 1, wherein the axial direction of the powertrain system is essentially perpendicular to a longitudinal vehicle direction, and wherein the powertrain system is arranged in connection to the vehicle for positioning the differential unit in a lateral centre section of the vehicle.

14. A vehicle according to claim 13, wherein the vehicle powertrain system is arranged in a front part or a rear part of the vehicle; or wherein the vehicle comprises a first vehicle powertrain system arranged in a front part of the vehicle and a second vehicle powertrain system arranged in a rear part of the vehicle.

15. A vehicle powertrain system comprising an electric motor, a planetary gear set, a coupling unit, and a differential unit,
wherein the electric motor is drivingly connected to the planetary gear set via a motor shaft extending in an axial direction, and wherein the planetary gear set is operably connectable to the differential unit via the coupling unit,
wherein the powertrain system further comprises an idle gear wheel and a differential drive gear wheel arranged on the differential unit, wherein the coupling unit is arranged for selectively transferring torque to the idle gear wheel, and wherein the idle gear wheel and the differential drive gear wheel are arranged to drivingly interact with each other for transferring torque from the electric motor to the differential unit, via the planetary gear set and the coupling unit,
wherein the differential unit is configured for being positioned in a lateral centre section of a vehicle in which the vehicle powertrain system is arranged;
wherein the planetary gear set comprises a sun gear, a ring gear, and two or more planet gears connected to a planet carrier, and wherein the coupling unit comprises a coupling shaft and an actuating member arranged on the coupling shaft, wherein the motor shaft is drivingly connected to the sun gear, the coupling shaft is drivingly connected to the planet carrier, and wherein the idle gear wheel is arranged on the coupling shaft; and
wherein the actuating member is a synchronizer slidingly arranged on the coupling shaft, and wherein the idle gear wheel is journally connected to the coupling shaft via a second bearing.

16. A vehicle powertrain system comprising an electric motor, a planetary gear set, a coupling unit, and a differential unit, wherein the electric motor is drivingly connected to the planetary gear set via a motor shaft extending in an axial direction, and wherein the planetary gear set is operably connectable to the differential unit via the coupling unit, wherein the powertrain system further comprises an idle gear wheel and a differential drive gear wheel arranged on the differential unit, wherein the coupling unit is arranged for selectively transferring torque to the idle gear wheel, and wherein the idle gear wheel and the differential drive gear wheel are arranged to drivingly interact with each other for transferring torque from the electric motor to the differential unit, via the planetary gear set and the coupling unit, wherein the differential unit is configured for being positioned in a lateral centre section of a vehicle in which the vehicle powertrain system is arranged;

wherein the planetary gear set comprises a sun gear, a ring gear, and two or more planet gears connected to a planet carrier, and wherein the coupling unit comprises a coupling shaft and an actuating member arranged on the coupling shaft, wherein the motor shaft is drivingly connected to the sun gear, the coupling shaft is drivingly connected to the planet carrier, and wherein the idle gear wheel is arranged on the coupling shaft; and wherein the coupling shaft extends in the axial direction in a coaxial relationship to the motor shaft, wherein the ring gear is coaxially arranged around the motor shaft and wherein the sun gear is arranged to rotate with the motor shaft around an axis extending in the axial direction.

* * * * *